(12) United States Patent
Minich et al.

(10) Patent No.: US 9,217,530 B2
(45) Date of Patent: Dec. 22, 2015

(54) EXTENDED RANGE TAPPING SLEEVE AND GASKET

(75) Inventors: Raymond C. Minich, Bradford, PA (US); Daryl Piontek, Great Valley, NY (US)

(73) Assignee: Total Piping Solutions, Inc., Olean, NY (US)

( * ) Notice: Subject to any disclaimer, the term of this patent is extended or adjusted under 35 U.S.C. 154(b) by 421 days.

(21) Appl. No.: 13/016,542

(22) Filed: Jan. 28, 2011

(65) Prior Publication Data

US 2012/0193909 A1    Aug. 2, 2012

(51) Int. Cl.
*F16L 41/06*    (2006.01)

(52) U.S. Cl.
CPC ..................................... *F16L 41/06* (2013.01)

(58) Field of Classification Search
CPC ............ F16L 41/08; F16L 41/12; F16L 47/30
USPC ............. 285/133.21, 197, 198, 199; 277/607, 277/626
See application file for complete search history.

(56) References Cited

U.S. PATENT DOCUMENTS

| | | | |
|---|---|---|---|
| 3,599,995 A | | 8/1971 | Rafalski, Jr. |
| 5,040,828 A | * | 8/1991 | Kane .............................. 285/197 |
| 5,358,286 A | * | 10/1994 | Eaton et al. .................... 285/197 |
| 5,362,107 A | * | 11/1994 | Bridges .......................... 285/15 |
| 5,374,087 A | * | 12/1994 | Powers .......................... 285/197 |
| 5,590,913 A | | 1/1997 | Morris et al. |
| 6,173,967 B1 | | 1/2001 | Eskew et al. |
| 7,070,209 B2 | * | 7/2006 | Collins .......................... 285/373 |
| 7,232,160 B2 | | 6/2007 | Krausz et al. |

FOREIGN PATENT DOCUMENTS

| | | |
|---|---|---|
| GB | 2119893 B1 | 11/1983 |
| JP | 2001050461 A | 2/2001 |

OTHER PUBLICATIONS

The International Search Report (ISR) and Written Opinion of the International Searching Authority for International Application No. PCT/US2012/022069; Publication No. WO 2012/102968; dated Nov. 12, 2012.
The International Preliminary Report on Patentability Chapter I for Application Serial No. PCT/US2012/022069; Publication No. WO 2012/102968; dated Jul. 30, 2013.

* cited by examiner

*Primary Examiner* — David E Bochna
(74) *Attorney, Agent, or Firm* — Phillips Lytle LLP

(57) ABSTRACT

A tapping sleeve assembly comprising a sleeve configured to clamp a main conduit, a gasket between the sleeve and main conduit, the gasket having a protruding aperture seal offset a distance from a branch aperture in the sleeve, the aperture seal having a first inwardly protruding portion extending substantially parallel to the longitudinal axis of the main conduit, an inwardly protruding circumferential seal bead extending substantially transverse to the longitudinal axis from the first portion of the aperture seal, the seal bead having a main length portion having a thickness less than the thickness of the first portion of the aperture seal, the seal bead having a junction end portion between the main length portion and the first portion of the aperture seal, the junction end portion having a non-uniform thickness, the aperture seal having a non-uniform thickness, and the offset distance being non-uniform.

24 Claims, 11 Drawing Sheets

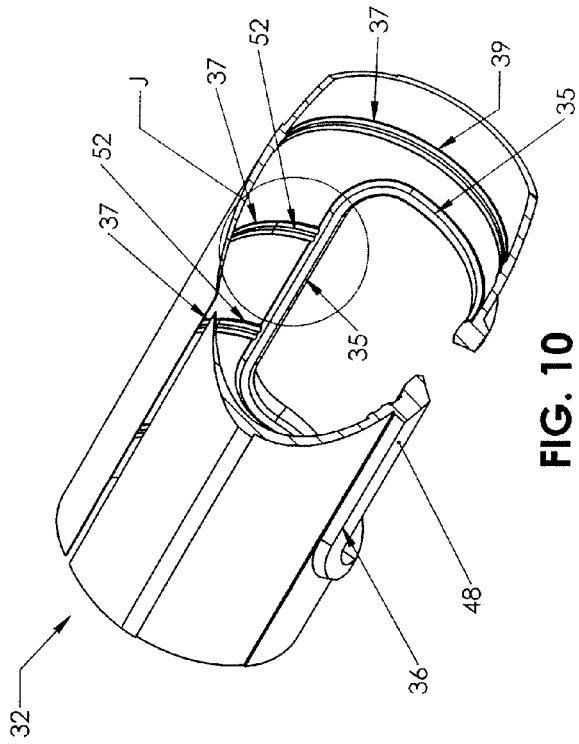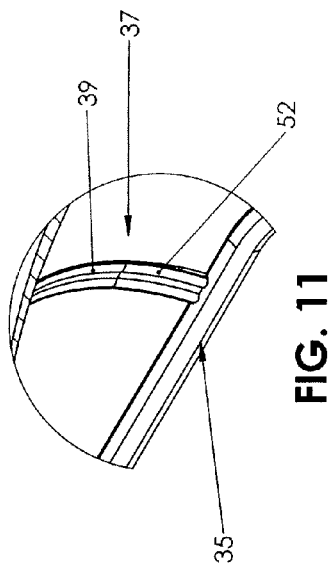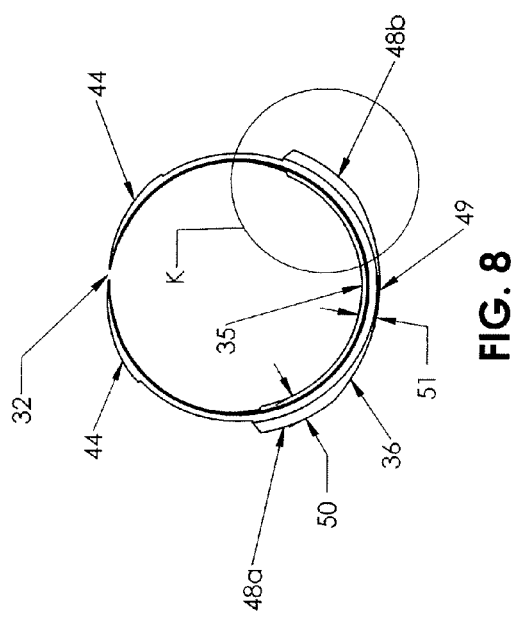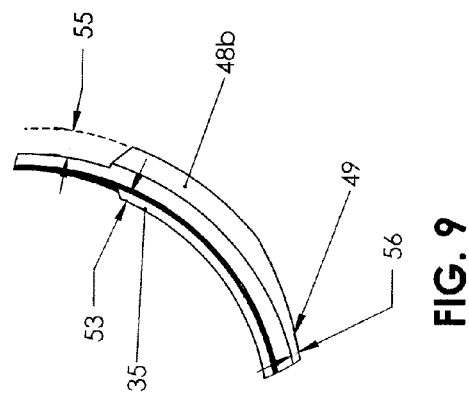

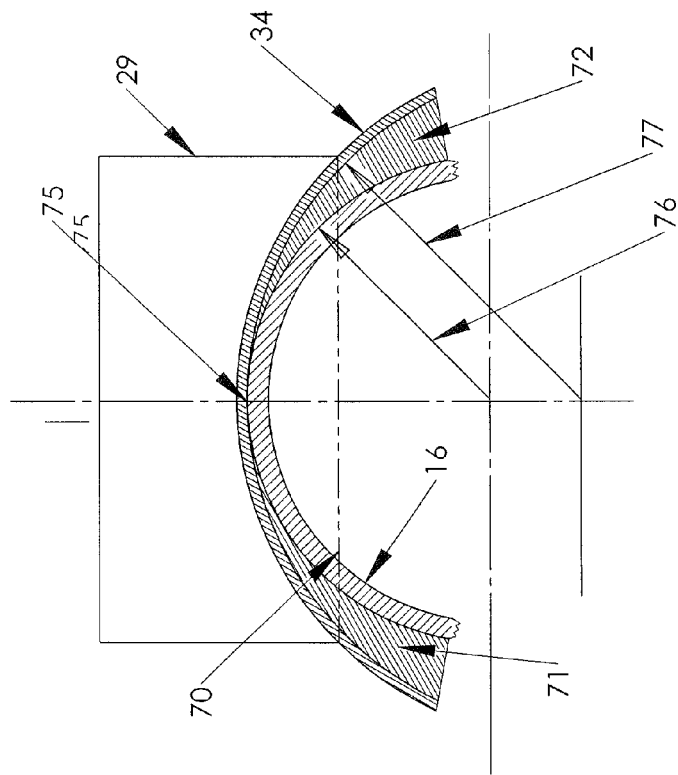
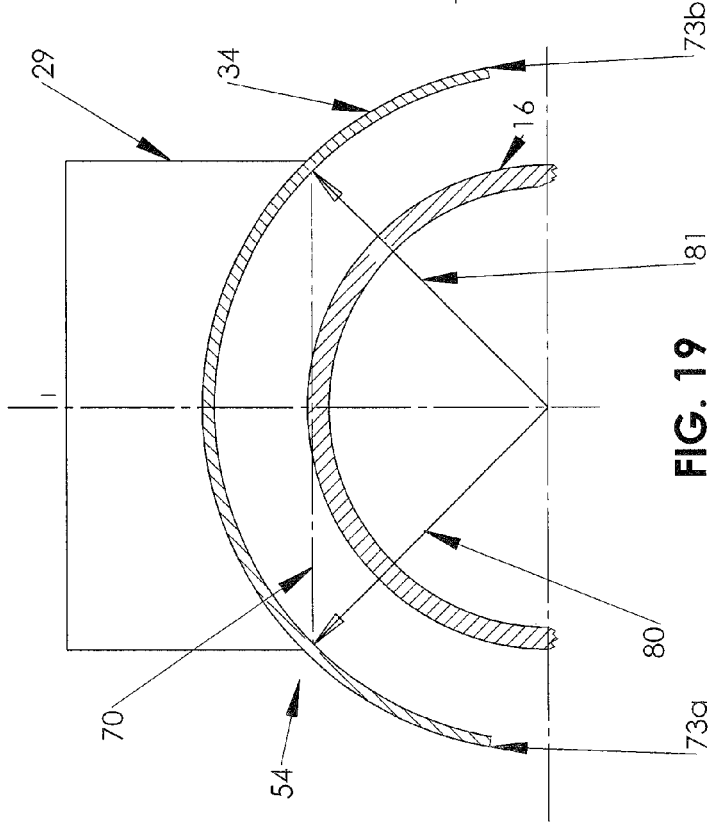

EXTENDED RANGE TAPPING SLEEVE AND GASKET

TECHNICAL FIELD

The present invention relates generally to the field of pipe fittings, and more particularly to an improved tapping sleeve and gasket.

BACKGROUND ART

Tapping sleeves are used to enable or permit branch connections to be made to fluid carrying (i.e. water main for distribution) pipes and pipelines. Current tapping sleeve designs typically employ branch sealing (aperture) gasket bead geometries of constant height cross sections, and locate the aperture seal immediately adjacent to the branch transition. However, existing tapping sleeve and gasket assemblies have a limited range of the minimum to maximum pipe diameter on which a given sleeve effectively seals to the fluid carrying pipe.

BRIEF SUMMARY OF THE INVENTION

With parenthetical reference to corresponding parts, portions or surfaces of the disclosed embodiment, merely for the purposes of illustration and not by way of limitation, the present invention provides an improved tapping sleeve assembly (14) comprising a sleeve (15) configured to clamp a main fluid conduit (16) oriented about a longitudinal axis (x-x), the sleeve having a first member (34), a second member (40) separate from the first member, and a connecting assembly (21) between the first member and the second member, the first member having a branch aperture (23) configured to communicate with a branch fluid conduit (29), the connection assembly configured and arranged to tighten the first and the second members to the main fluid conduit, a gasket (32) disposed between the first member and the main fluid conduit, the gasket having a protruding aperture seal (22) configured to extend around the branch aperture between the sleeve and the main fluid conduit and to be offset a distance (57) from the branch aperture, the aperture seal having a first inwardly protruding portion (35) extending substantially parallel to the longitudinal axis and having a thickness (53), at least one inwardly protruding circumferential seal bead (37) extending substantially transverse to the longitudinal axis from the first inwardly protruding portion of the aperture seal bead, the circumferential seal bead having a main length portion (39) having a thickness less than the thickness of the first portion of the aperture seal, the circumferential seal bead having a junction end portion (52) between the main length portion and the first portion of the aperture seal, the junction end portion of the circumferential seal bead having a non-uniform thickness, the protruding aperture seal having a non-uniform thickness (50-51), and the offset distance being non-uniform (57a-c).

The aperture seal may comprise a first outwardly extending (36) longitudinally running portion (48) and a first outwardly extending transversely running portion (49) and the radial thickness (56) of the first transversely running portion is reduced from the radial thickness (55) of the first longitudinally running portion. The first transversely running portion may have a thickness that changes in proportion to its transverse distance from the longitudinal axis, and the change in thickness may be non-linear. The connection assembly may comprise a first side bar element (19) connected to a longitudinally extending edge (74) of the first member and a second side bar element (24) connected to a longitudinally extending edge (73) of the second member, the first side bar comprising a first mounting plate (66) oriented in a plane substantially tangential to an outer surface of the conduit, the second side bar comprising a second mounting plate (67) oriented in a plane substantially tangential to an outer surface of the conduit, multiple bolt receiving lugs (28) extending from the first mounting plate and multiple bolt receiving lugs (26) extending from the second mounting plate at corresponding positions along the longitudinal axis, and a bolt (18) extending between each of the respective lugs on the first mounting plate and the second mounting plate at each of the longitudinal positions, whereby the first side bar and the second side bar may be drawn towards each other with a nut (20) on each of the respective bolts.

In another aspect, the invention provides a tapping sleeve assembly comprising a sleeve (15) configured to clamp on to a main fluid conduit (16) oriented about a longitudinal axis (x-x), the sleeve having a first member (34), a second member (40) separate from the first member, and a connecting assembly (21) between the first member and the second member, a branch aperture (23) in the first member communicating with a branch fluid conduit (29) attached to the first member, the connection assembly configured and arranged to tighten the first and the second members to the main fluid conduit from a non-actuated position to a tightened position, a gasket (32) disposed between the first member and the main fluid conduit, the gasket comprising a flexible sheet (33) having an inwardly facing surface and an outwardly facing surface and a thickened aperture seal (22) configured to extend around the branch aperture between the sleeve and the main fluid conduit, and the aperture seal having a non-uniform radial thickness (50, 51) around the branch aperture between the first member and the main fluid conduit when the connection assembly is in the loosened position.

The aperture seal may comprise a first outwardly extending (36) longitudinally running portion (48a) and a first outwardly extending transversely running portion (49a) and the radial thickness (56) of the first transversely running portion is reduced from the radial thickness (55) of the first longitudinally running portion. The first transversely running portion may have a thickness (51) that changes in proportion to its transverse distance from the longitudinal axis, and the change in thickness may be non-linear. The aperture seal may comprise a second outwardly extending longitudinally running portion (48b) and a second outwardly extending transversely running portion (49b) and the radial thickness of the second transversely running portion is reduced from the radial thickness of the second longitudinally running portion. The aperture seal may comprise a portion (49) having a cross-sectional thickness (51) that changes substantially in proportion to its transverse distance from the longitudinal axis. The aperture seal may have a first portion (48) having a first thickness (50) and a second portion (49) having a second thickness (51), wherein the first portion is compressed between the first member and the main fluid conduit before the second member is compressed between the first member and the main fluid conduit when the connection assembly is tightened from the loosened position to the tightened position. The aperture seal may be offset (57) a distance from the branch aperture and the offset distance may be non-uniform. The aperture seal may be molded separately from the flexible sheet. The connection assembly may comprise a first side bar element (19) connected to a longitudinally extending edge (74) of the first member and a second side bar element (24) connected to a longitudinally extending edge (73) of the second member, the first side bar comprising a first mounting plate (66) oriented in a plane substantially tangential to an outer surface of the conduit, the second side bar comprising a second mounting plate (67) oriented in a plane substantially tangential to an outer surface of the conduit, multiple bolt receiving lugs (28) extending from the first mounting plate and multiple bolt receiving lugs (26) extending from the second mounting plate at corresponding positions along the longitudinal axis, and a bolt (18) extending between each of the respective lugs on the first mounting plate and the second mounting plate at each of the longitudinal positions, whereby the first side bar and the second side bar may be drawn towards each other with a nut (20) on each of the respective bolts. The first and the second side bars may be L-shaped members.

In another aspect, the invention provides a tapping sleeve assembly comprising a sleeve configured to clamp a main fluid conduit oriented about a longitudinal axis, the sleeve having an upper shell portion, a lower shell portion, a first spanner (30) configured to extend across a first longitudinally extending gap between the upper shell portion and the lower shell portion, a second spanner (31) configured to extend across a second longitudinally extending gap between the upper shell portion and the lower shell portion, and a connecting assembly between the upper shell portion and the lower shell portion, the first portion having a branch aperture configured to communicate with a branch fluid conduit, the connecting assembly configured and arranged to tighten the upper portion, the lower portion, the first spanner and the second spanner around the main fluid conduit, a gasket (32) disposed between the first spanner and the main fluid conduit, the gasket having a recess (61) for receiving at least a portion of the first spanner, the recess having a depth (62) and the first spanner having a thickness (63) greater than the recess depth, and the first spanner having a chamfered longitudinally extending edge (59).

The gasket may have a second recess for receiving at least a portion of the second spanner, the second recess may have a depth and the second spanner may have a thickness greater than the second recess depth, and the second spanner may have a chamfered longitudinally extending edge.

In another aspect, the invention provides a tapping sleeve assembly comprising a sleeve configured to clamp on to a main fluid conduit oriented about a longitudinal axis, the sleeve having a first member, a second member separate from the first member and a connecting assembly between the first member and the second member, the first member having a branch aperture configured to communicate with a branch fluid conduit, the connection assembly configured and arranged to tighten the first and the second members to the main fluid conduit, a gasket disposed between the first member and the main fluid conduit, the gasket comprising a flexible sheet and a thickened aperture seal configured to extend around the branch aperture between the sleeve and the main fluid conduit, the aperture seal having a first inwardly extending portion (35) extending substantially parallel (48) to the longitudinal axis, the first portion of the aperture seal having a thickness (53), the gasket having at least one inwardly extending circumferential seal bead (37) extending substantially transverse to the longitudinal axis from the first portion of the aperture seal bead, the circumferential seal bead having a main length portion (39) having a thickness less than the thickness of the first portion of the aperture seal, the circumferential seal bead having a junction end portion (52) between the main length portion and the first portion of the aperture seal, and the junction end portion of the circumferential seal bead having a thickness greater than the thickness of the main portion.

The end portion may be tapered from substantially the thickness of the main portion to substantially the thickness of the first portion of the aperture seal. The circumferential seal bead may have a dual lip configuration.

In another aspect, the invention provides a tapping sleeve assembly comprising a sleeve configured to clamp a main fluid conduit oriented about a longitudinal axis, the sleeve having a first portion, a second portion separate from the first portion and a connecting assembly between the first portion and the second portion, a branch aperture (23) in the first member communicating with a branch fluid conduit attached to the first member at a branch junction (54) and oriented about a branch longitudinal axis (y-y), the connection assembly configured and arranged to tighten the first and the second portions to the main fluid conduit, a gasket disposed between the first portion and the main fluid conduit, the gasket having an aperture seal configured to extend around the branch aperture between the sleeve and the main fluid conduit and to be offset outwardly a distance (57) from the branch aperture, and the offset distance being non-uniform (57a-c).

The aperture seal may comprise a first protruding portion (48) having an offset distance (57a) from the branch junction and orientated substantially parallel to the longitudinal axis, a second protruding portion (49) having an offset distance (57c) from the branch junction and orientated substantially transverse to the longitudinal axis, wherein the offset distance of the first portion is different than the offset distance of the second portion. The offset distance of the first portion may be less than the offset distance of the second portion. The aperture seal may comprises an arcuate protruding portion offset outwardly from the branch junction and having an inner radius of curvature (57b) relative to the branch longitudinal axis, wherein the branch fluid conduit has a branch diameter and the inner radius of the arcuate portion is less than about twenty-five percent of the branch diameter. The branch fluid conduit attachment to the first member at the branch junction may substantially stiffen the first member in a region proximate to the branch junction and the offset may be outside the stiffened region.

Accordingly, the general object is to provide a tapping sleeve that provides for sufficient gasket sealing force and seal pressure to seal the tapping sleeve body to the main fluid carrying pipe with varying pipe outside diameters and pipe materials within a nominal pipe diameter range.

Another object is to provide a tapping sleeve that may be used on extended ranges of pipe outside diameters.

Another object is to provide a tapping sleeve that reduces the number of different sleeves that must be held in inventory to cover the range of pipe diameters encountered in a given nominal pipe diameter range.

Another object is to provide a tapping sleeve that at least doubles the range of pipe diameters on which a given tapping sleeve nominal size may be employed, compared to the current products available in the marketplace.

Another object is to provide a tapping sleeve having improved performance and operational efficiency.

These and other objects and advantages will become apparent from the foregoing and ongoing written specification, the drawings, and the claims.

BRIEF DESCRIPTION OF THE DRAWINGS

FIG. 8 is a front view of the upper gasket shown in FIG. 3.

FIG. 9 is an enlarged detailed view of the upper gasket shown in FIG. 8, taken within the indicated circle K of FIG. 8.

FIG. 10 is a partial cutaway isometric view of the upper gasket shown in FIG. 2.

FIG. 11 is an enlarged detailed view of the upper gasket shown in FIG. 10, taken within the indicated circle J of FIG. 10.

FIG. 19 is a partial schematic view of the upper shell, branch pipe and main pipe shown in FIG. 3 in a non-actuated condition.

FIG. 20 is a partial schematic view of the minimum additional space filled by the upper gasket shown in FIG. 3.

DETAILED DESCRIPTION OF THE PREFERRED EMBODIMENTS

Figure 1:
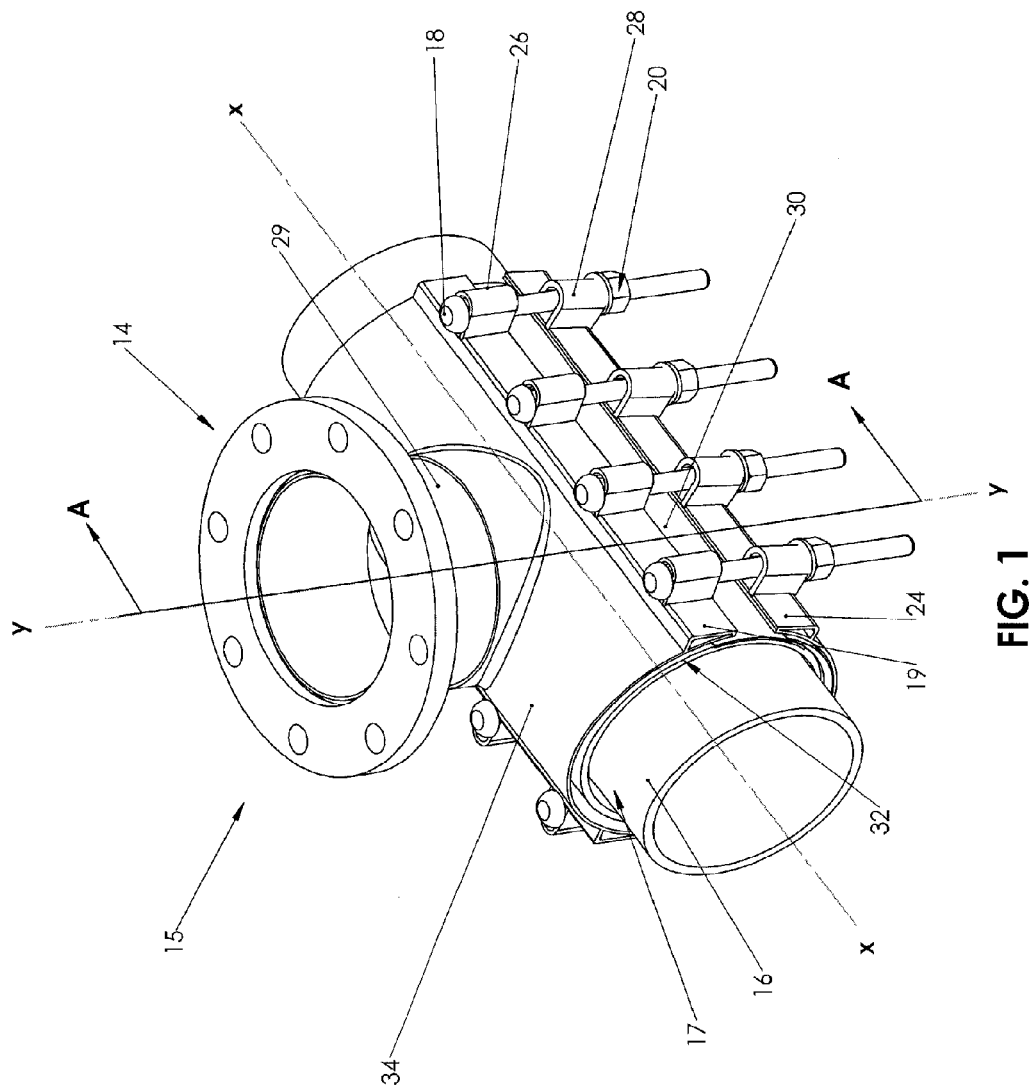
FIG. 1 is a top isometric view of an embodiment of the improved tapping sleeve and gasket assembly in engagement with a pipe.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
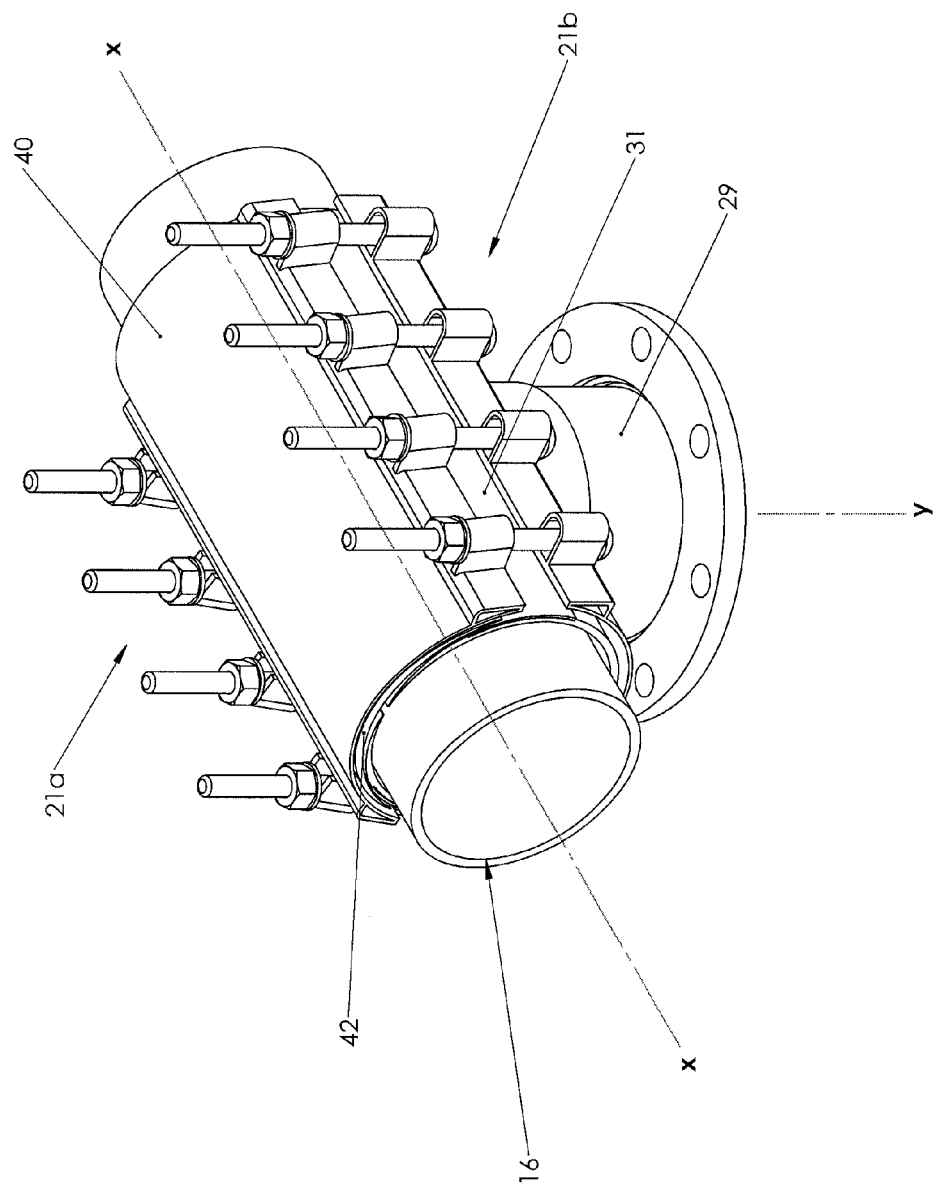
FIG. 2 is a bottom isometric view of the tapping sleeve assembly shown in FIG. 1.
Figure 3:
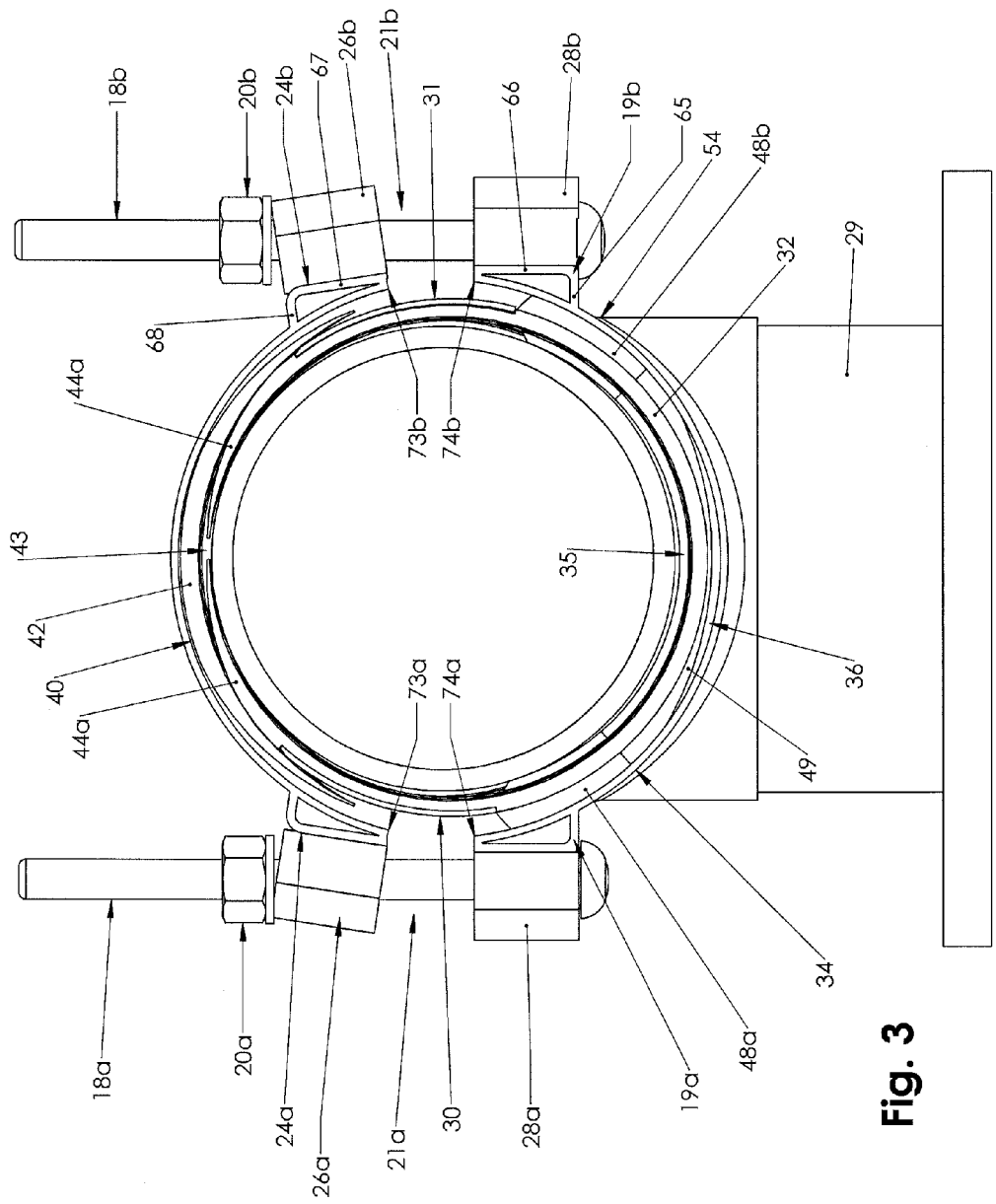
FIG. 3 is a left side view of the tapping sleeve assembly shown in FIG. 2.
Figure 5:
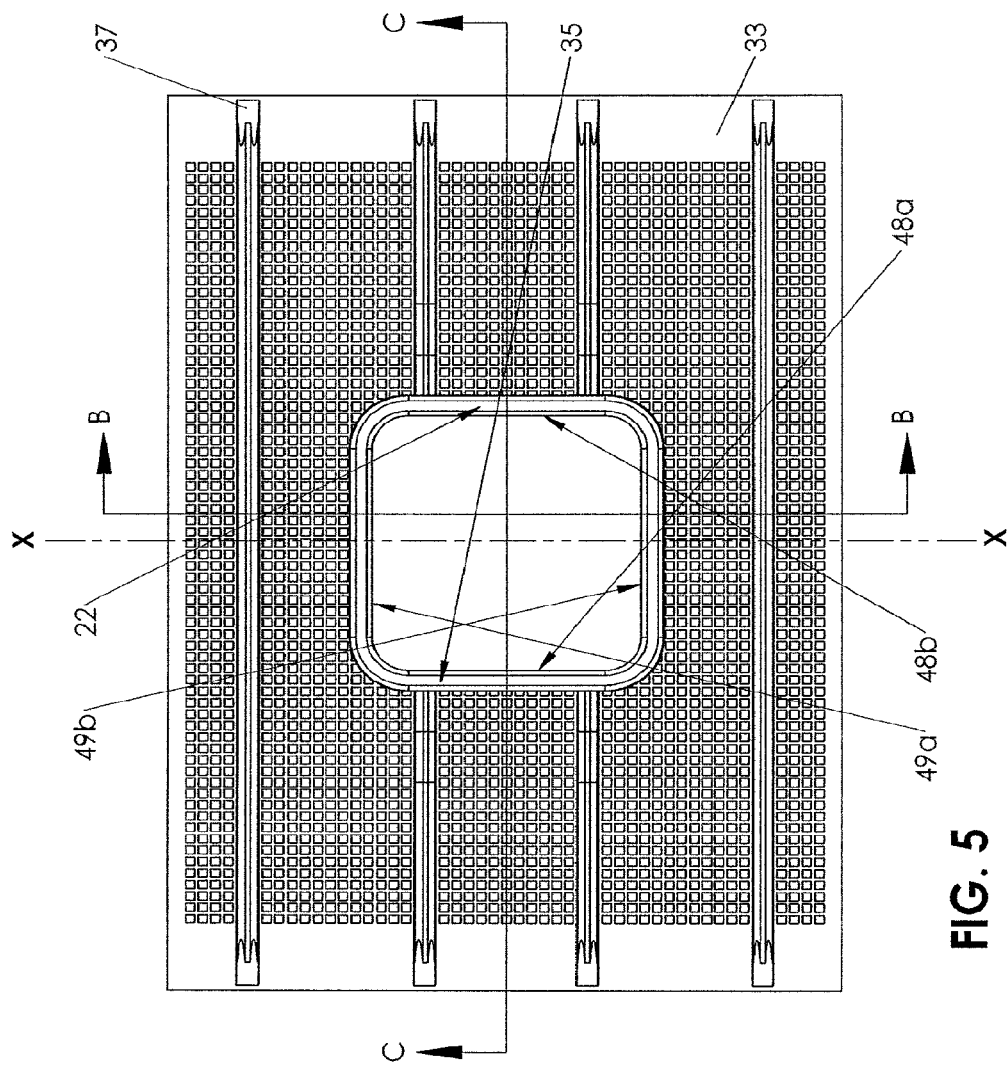
FIG. 5 is a top plan view of the upper gasket shown in FIG. 1 unrolled.
Figure 4:
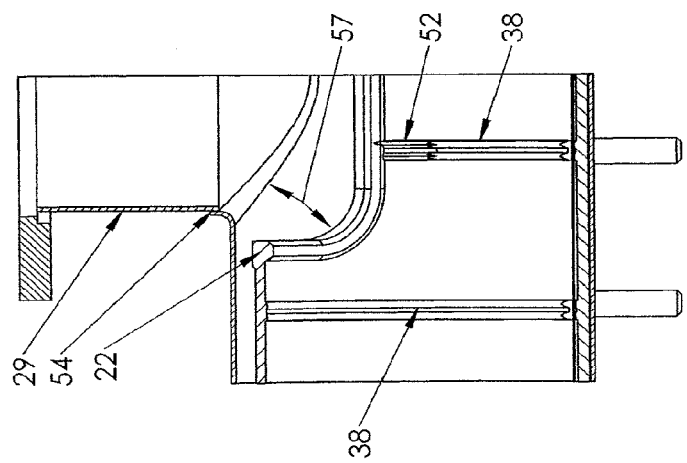
FIG. 4 is a transverse vertical cross-sectional view of the tapping sleeve assembly shown in FIG. 1, taken generally on line A-A of FIG. 1.

Referring now to the drawings, and more particularly to FIG. 1 thereof, this invention provides an improved tapping sleeve and gasket assembly, of which the presently preferred embodiment is generally indicated at 14. As shown in FIGS. 1-3, assembly 14 generally comprises tapping sleeve 15, which in operation is mounted on the outside of pipe 16, and gasket 17, which in operation is disposed between pipe 16 and sleeve 15.

Tapping sleeve 15 includes semi-cylindrical top half shell 34, semi-cylindrical lower half shell 40, and specially configured spanners 30 and 31. Top half shell 34 and bottom half shell 40 are connected and tightened around pipe 16 with connection assembly 21.

Gasket 15 includes upper gasket 32 and lower spanning gasket 42. As described in further detail below, upper gasket 32 and lower gasket 42 are flexible elastomeric matte gasket sheets having specially contoured raised or thickened sealing beads, including circumferential seal beads 37 and thickened branch aperture seal 22 on upper gasket 32.

Tapping sleeve assembly 14 is founded by joining and welding in place a cylindrical branch connection 29 to top half shell 34, which is then mated to fluid carrying pipe 16 with upper gasket 32, lower half shell 40 and lower gasket 42. Gaskets 32 and 42 are sandwiched between the inside cylindrical surfaces of shells 34 and 40 and the outside cylindrical surface of main fluid carrying pipe 16 to provide sufficient sealing force to prevent leakage of fluid from the interface once a tap is made into fluid carrying pipe 16 through branch outlet 29. Elastic (sealing) energy is imparted into the structure by tightening or actuating connections 21a and 21b from a loosened or non-actuated position, shown in FIG. 3, to a tightened sealed position.

As shown in FIGS. 1-3, L-shaped sidebars 19a and 19b are welded to the two edges 73a and 73b of top shell 34 that are coincident with the longitudinal axis x-x of pipe 16 and L-shaped sidebars 24a and 24b are welded to the two edges 74a and 74b of lower shell 40 that are coincident with the longitudinal axis x-x of pipe 16. As shown, each side bar is formed of a first generally horizontally extending member 65 and a second generally vertically extending member 66 joined at one longitudinal edge to the longitudinal edge of the respective shell and connected at the other longitudinal edge to the outer longitudinal edge of horizontal member 65, with horizontal member 65 not being as wide as vertical member 66. Thus, side bars 19 and 24 are configured such that they do not extend horizontally from axis x-x substantially beyond the longitudinal edges 73 and 74 of top shell 34 and lower shell 40, respectively, when shells 34 and 40 are in an un-tightened or non-actuated position. Instead, a series of lugs, severally indicated at 26 and 28, are in turn welded to sidebars 19 and 24, respectively, to provide the necessary clearance outside of shells 34 and 40 for bolts 18. Threaded bolts 18 extend between lugs 26 and 28 and corresponding nuts 20 are tightened on bolts 18 to draw sidebars 19 of top shell 34 and opposed sidebars 24 of lower shell 40 together, thereby tightening sleeve 15 to pipe 16. Alternatively, connection assemblies 21 may be formed as complete castings. Connections 21a and 21b result in less stiffening of the longitudinal ends of shells 34 and 40 and thereby allow sleeve 15 to flex and actuate gasket 32 to form a tight seal when connections 21a and 21b are tightened.

As shown in FIGS. 3 and 5-11, upper gasket 32 is sized to encircle substantially completely the outside diameter of the smallest diameter fluid carrying pipe 16 for the given sleeve size. Lower matte gasket 42 is sized to span the zone of reduced gasket thickness and any gap between the longitudinal tapered proximal edge portions 44a and 44b of lower gasket 32. Thus, as the pipe diameter on which assembly 14 is installed increases, upper matte gasket 32 ends 44a and 44b separate, and lower matte gasket 42 further engages upper gasket 32 to continue the sealing action.

As explained in further detail below with respect to upper gasket 32, lower gasket 42 includes inwardly extending raised seal beads that running circumferentially and transversely to the longitudinal axis x-x of pipe 16. The inner seal beads face the outer surface of fluid carrying pipe 16 to provide for increased localized gasket sealing pressure.

As shown in FIGS. 3-20, upper gasket 32 is formed of a flexible sheet 33 with a specially contoured thickened aperture seal 22 and multiple transversely extending protruding or raised inner circumferential seal beads 37. Aperture seal 22 has a specially contoured profile and shape that includes protruding or raised inner aperture seal bead 35 and protruding or raised outer aperture seal bead 36. While shown as being integrally molded as part of gasket 32, main aperture seal 22 could be molded separately from the remainder of gasket 32, thereby allowing for different main seal profiles to be used interchangeably, which provide manufacturing costs reductions and improved inventory efficiency.

As shown, sheet 33 of upper gasket 32 includes inwardly extending raised seal beads 37 that running circumferentially and transversely to longitudinal axis x-x of fluid carrying pipe 16. Inner seal beads 37 face the outer surface of fluid carrying pipe 16 to provide for increased localized gasket sealing pressure. These circumferential seal beads provide for improved seal performance if main fluid carrying pipe 16 should suffer a complete circumferential break, as is possible when tapping sleeve 14 is used to branch into brittle conductor pipe materials such as ductile iron, asbestos cement or concrete pipe materials. These circumferential raised seal beads provide matte gasket stiffening support, and prevent the matte gasket from undergoing extrusion at the shell free ends.

As shown in FIGS. 10 and 11, certain of circumferential seal beads 37 on the inside (pipe 16 side) of upper matte gasket 32 include a tapered portion 52 to an increased thickness where they approach and meet the longitudinally extending portion of inner aperture seal bead 35. Inner aperture seal bead 35 is generally thicker than the main portion 39 of circumferential seal beads 37. Tapered portion 52 thickens the end portions of beads 37 to about the same thickness as aperture seal bead 35. This thickened portion supports seal bead 35 and provides more uniform compression and better seal strength. Circumferential seal beads employing this ramped or inclined section 52 in the vicinity of the main aperture seal 22 substantially reduce a potential leak path that might otherwise occur due to rubber "fold-over". Thus, it helps reduce the chances of a leak path forming that might otherwise occur with an abrupt thickness change at the junction between aperture seal bead 35 and circumferential seal bead 37.

Circumferential seal beads 37 utilize a double o-ring radial inwardly-facing geometry. Thus, the main matte gasket circumferential seal beads (both upper and lower gasket sheets) have parallel (double) seal beads of semicircular cross section, raised by pedestal above the main gasket sheet sealing surface, to provide for increased seal pressure and seal reliability.

As shown in FIGS. 3 and 5-8, branch aperture seal 22 has a varying, non-uniform thickness relative to axis x-x and, as shown in FIGS. 4 and 12-15, is substantially set back or separated from branch line 29 to upper shell 34 connection 54 by a varying and non-uniform distance 57.

Figure 13:
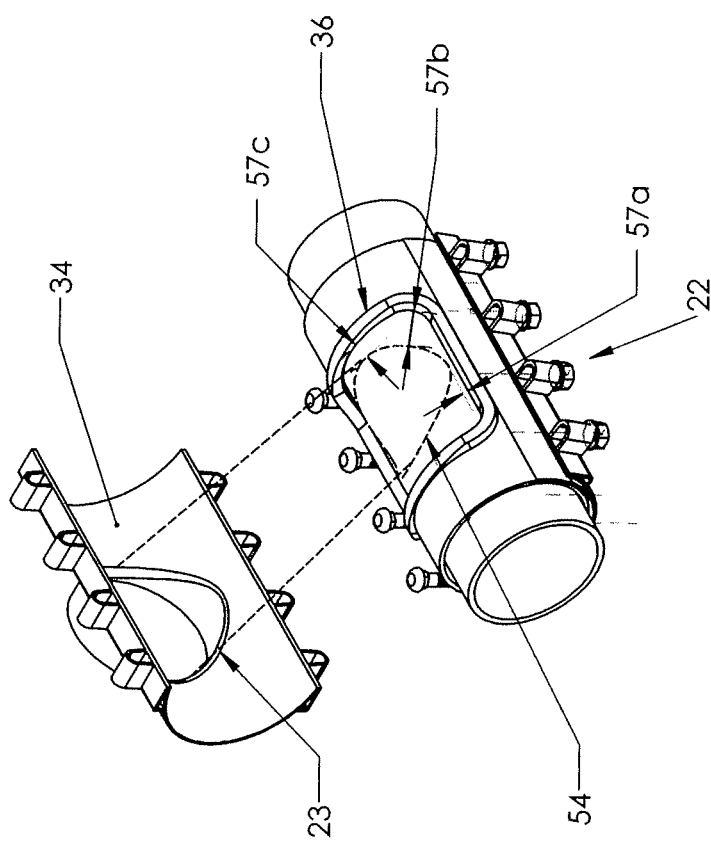
FIG. 13 is a partial exploded isometric view of the tapping sleeve shown in FIG. 1 without the branch line shown and including a projection of the branch aperture.
Figure 15:
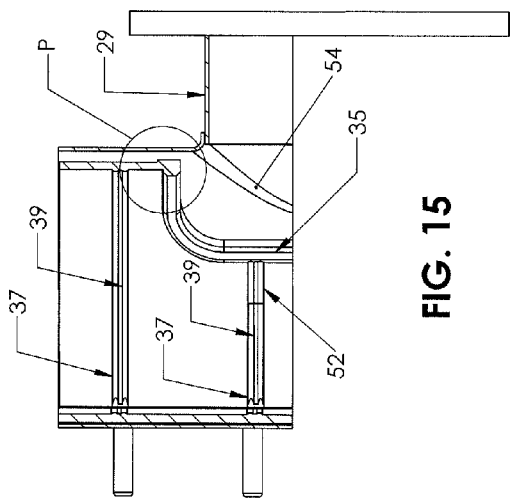
FIG. 15 is a horizontal cross-sectional view of the tapping sleeve assembly shown in FIG. 14, taken generally on line N-N of FIG. 14.
Figure 16:
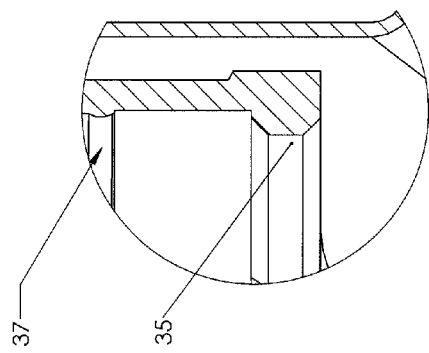
FIG. 16 is an enlarged detailed view of the tapping sleeve assembly shown in FIG. 15, taken within the indicated circle P of FIG. 15.
Figure 14:
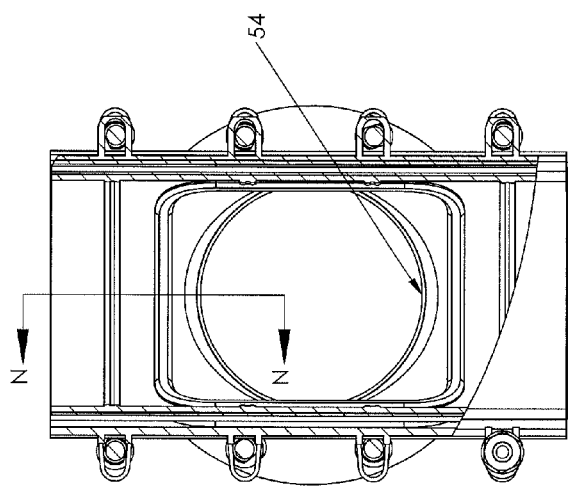
FIG. 14 is a partial horizontal cross-sectional view of the tapping sleeve assembly shown in FIG. 2.
Figure 17:
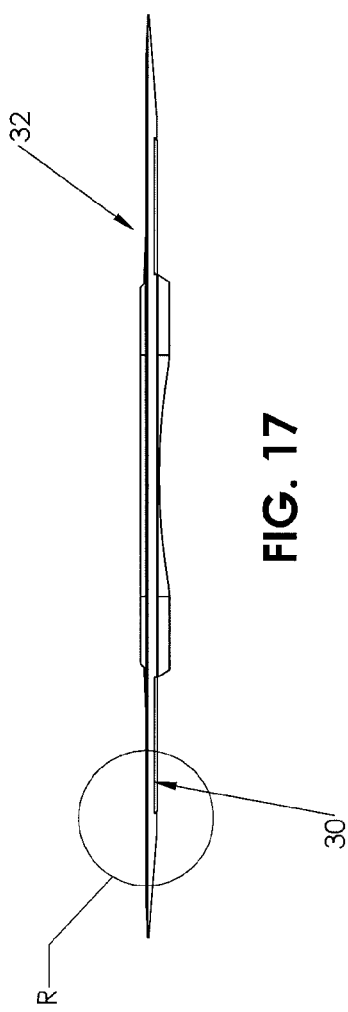
FIG. 17 is an unrolled side view of the upper gasket and spanner shown in FIG. 3.

FIG. 13 is an exploded view and shows the projection of shell aperture 23 on pipe 16 and set-off 57 relative to shell aperture 23. As shown, in this embodiment the varying, non-uniform set-off 57 from shell aperture 23 is achieved by providing a generally rectangular aperture seal path 22 placed a distance 57 away from the generally circular aperture 23 in upper sleeve 34 and the upper sleeve 34 to branch 29 transition or connection 54. As an alternative, seal contact path 22 may be elliptical, polygonal or rhombic. The top shell 34 to branch 29 attachment connection 54 (typically a welded joint) tends to stiffen a region of upper shell 34, which limits deflection (radial flexure) in the vicinity of branch 19 as sleeve 15 is tightened to fluid carrying pipe 19. Set-off 57b moves seal path 22 outward of this stiffened region, resulting in an improved seal as sleeve 17 is tightened to fluid carrying pipe 16.

In this embodiment, minimum set-off distance 57a between the longitudinally extending portion of seal 22 and connection 54 and is about $\frac{1}{16}$ of an inch. In this embodiment, the minimum set-off distance 57c between the transversely extending portion of seal 22 and connection 54 is about $\frac{1}{16}$ of an inch, and is typically about $\frac{1}{2}$ an inch and greater than set-off distance 57a. The radius 57b of the inside curvature of seal bead 22, where the transverse portion of aperture seal bead 22 meets the longitudinal portion, will typically be not greater than about 25% of the diameter of branch tube 29. Thus, for a 6.625 inch diameter branch tube 29, radius 57b is about 1.25 inches.

Thickened branch aperture sealing portion 22 of upper gasket 32 utilizes specially profiled radial sealing bead heights or thicknesses 51 and 52 between top shell 34 and pipe 16, which positions more gasket material against the fluid carrying pipe outer surface parallel to the longitudinal axis x-x of pipe 16. The aperture seal profile gradually reduces in thickness (reduced gasket material) in the direction perpendicular to longitudinal axis x-x of pipe 16. Branch aperture sealing portion 22 employs sealing beads both on the inside 35 (fluid carrying pipe 16 side) and on the outside 36 (tapping sleeve side) of upper matte gasket 32 and sheet 33. The additional branch aperture seal gasket thickness is distributed non-uniformly between the inside (fluid carrying pipe 16 side) and the outside (tapping sleeve side) of matte gasket 32. Gasket sealing force at the minimum fluid carrying pipe diameter is thereby achieved by uniform compression of the additional thickness of the branch aperture seal material. And gasket sealing force at the maximum fluid carrying pipe diameter is thereby achieved by additional compression of the entire gasket sealing beads with no significant loss of material integrity or gasket service life.

In particular, in this embodiment inner aperture seal bead 35 has a uniform radial thickness 53 or protrudes inwardly from sheet 33 a uniform distance. While in this embodiment inwardly facing gasket seal bead 35 is of uniform thickness 53 and projects at a uniform height above main gasket 33, the total aperture seal bead thickness (inner seal bead 35 thickness, plus gasket sheet 33 thickness, plus outer seal bead 36 hyperbolic thickness) 50/51 may be distributed in such a manner that the inward facing aperture seal bead may be of non-uniform thickness or tip projection distance from main gasket sheet 33 in order to adjust for gasket compression. The thickness of main gasket sheet 33 may intersect the total aperture seal bead 22 thickness/height at any radial point along the total aperture seal bead 22 thickness.

Figure 7:
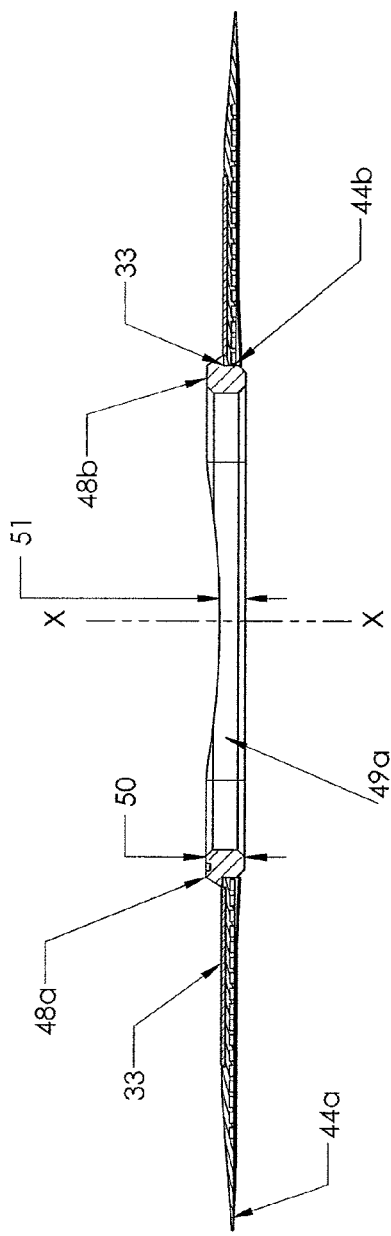
FIG. 7 is a transverse vertical cross-sectional view of the upper gasket shown in FIG. 5, taken generally on line C-C of FIG. 5.
Figure 6:
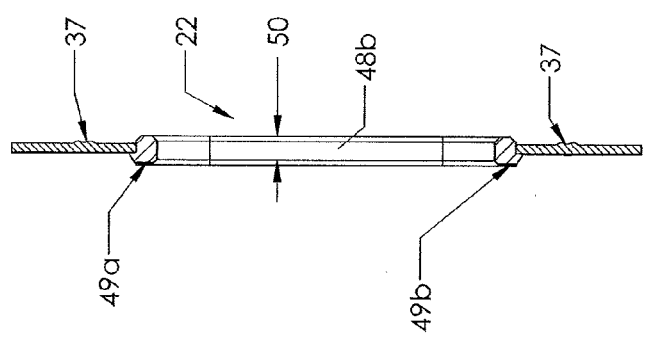
FIG. 6 is a longitudinal vertical cross-sectional view of the upper gasket shown in FIG. 5, taken generally on line B-B of FIG. 5.
Figure 12:
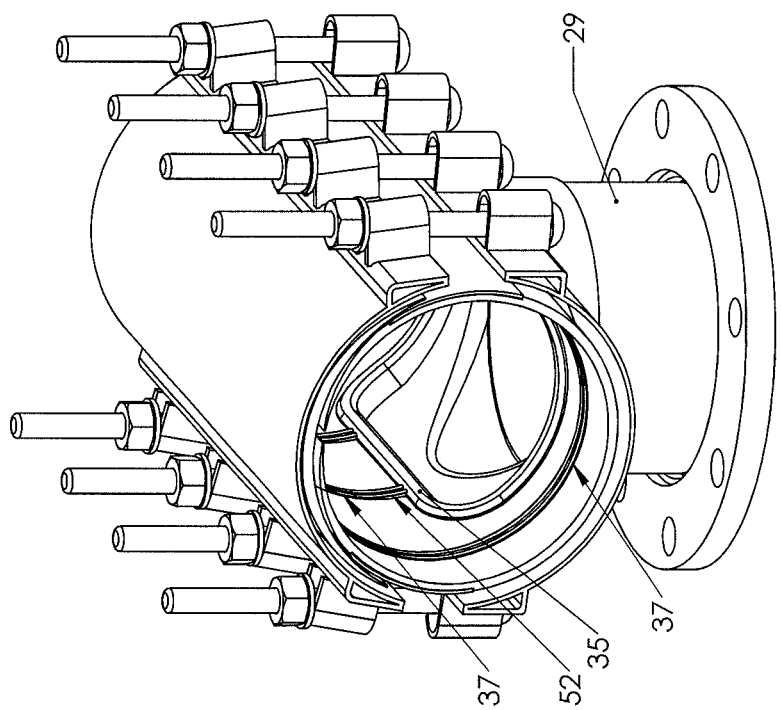
FIG. 12 is a left internal isometric view of the tapping sleeve shown in FIG. 2.

In this embodiment outer aperture seal bead 36 is not of a uniform radial thickness or height and instead varies between a thicker 55 or more raised profile portion 48 along that portion of seal 22 that is parallel to longitudinal axis x-x of pipe 16 to a reduced or thinning 56 profile portion 49 in the transverse direction or perpendicular to longitudinal axis x-x of fluid carrying pipe 16. This results in positioning of more gasket material against the fluid carrying pipe outer surface parallel to the longitudinal axis of the fluid carrying pipe and reduced gasket material in the direction perpendicular to the longitudinal axis of the fluid carrying pipe. As shown in FIGS. 3 and 7, the thickness 56 of thinned portion 49 of seal bead 36 is proportional to its transverse distance from longitudinal axis x-x. In this embodiment the thinnest sections 51 of seal 22 are at its intersection with the x-y plane, and from these points the thickness of portions 49 increase gradually, in this embodiment non-linearly, with the increase in transverse distance from longitudinal axis x-x, until reaching a maximum total thickness 50. Alternative curves or tapers may be employed.

FIG. 19 shows the general orientation and special geometry of upper shell 34, branch tube 29, and pipe 16 in a non-actuated condition, with gasket 32 omitted for clarity. Radials 80 and 81 in FIG. 19 indicate the extents of region 54, where branch tube 29 attaches to upper shell 34. Above line 70 of FIG. 19, branch tube 29 is attached to upper shell 34. Typically, attaching branch tube 29 to upper cylindrical half shell 34 stiffens the upper shell 34 sufficiently along the length of the shell to branch tube contact, the region above line 70, to prevent radial inward deflection of upper shell 34 when downward forces are applied to ends 73a and 73b of upper shell 34 when connector 21 is actuated or clamped and gasket 17 is compressed during product installation.

FIG. 20 shows the generation of hyperbolic triangle regions 71 and 72, which represent in cross-section the minimum material that is added to seal bead 22 on the tapping sleeve shell side of main sheet gasket 32 in this embodiment. Thus, hyperbolic triangles 71 and 72 represent typical cross sections and thicknesses of the minimum additional outwardly extending material that is added to the sum of gasket sheet 33 and inwardly extending aperture seal bead 35 thicknesses to form an effective seal. The hyperbolic triangles are formed by arcs of different radii (pipe external radius 76 and shell internal radius 77) emanating from the same line 75, terminating at what is the outermost extents of the aperture seal in this cross sectional view.

The hyperbolic triangles depict the typical regions/areas/volumes that are to be filled with additional gasket material. However, the hyperbolic triangles do not define the extent or limit the extent, or shape, of the additional material thickness that may added to the gasket thickness, which may be more or less than the areas represented by hyperbolic triangles 71 and 72, in order to adjust gasket compression. The amount of additional gasket material that may be added to the aperture seal bead is not limited to the volume or area of the region depicted by hyperbolic triangles 71 and 72. The location and area/region/volume of the hyperbolic triangles depict the location of the typical voids that are filled with and occupied by the gasket material added to the sum of the gasket sheet thickness and the inner aperture seal bead thickness.

The range of pipe diameters on which conventional tapping sleeve designs can be sealed is limited by the top shell branch attachment connection 54 (typically a welded joint) which stiffens or "locks in" the tapping sleeve upper shell formed arc radius, and subsequently the tapping sleeve assembled diameter. This weld connection stiffens a region of the upper shell and prohibits further diametral deflection (radial flexure) in the vicinity of the branch, as the sleeve is tightened to the fluid carrying pipe. The limiting factor is the radius of the arc in the upper shell, which gets fixed at the junction of the upper shell and the branch tube. Typically the radius of that fixed arc in conventional products is about 0.100 to 0.300 inches greater than the radius of the branch pipe. In this embodiment, the radius of arc 85 in upper shell 34 at juncture 54 is typically about 0.6 to 0.7 inches greater than the radius of the smallest pipe 16 in the shell's range. For example, upper (branch side) shell 34 can be provided with an inside radius of 4.00 inches and be used on pipe 16 having a diameter range of between about 6.6 inches (3.3" r) and about 7.4 inches (3.7" r). For this configuration, gasket 32 maxes out at about a 0.7 inch thickness at the longitudinal run 48 of aperture seal 22.

As shown, sealing beads 35 and 36 are of a rounded rectangular shape and take advantage of the elastic deflection that occurs in the vicinity of the branch to upper shell connection 54 when sleeve assembly 14 is installed and bolt 18 tension is applied. While in this embodiment the cross sectional profiles of the both internal and external aperture seal beads 35 and 36 are rectangular with chamfered corners at the tip edges, the inner and outer aperture seal bead cross sections that may be rounded, square, rhombic, triangular, polygonal, multi-profiled, or any combination of same.

Near shell to branch transition 54, top shell 34 behaves as a rigid body. Between branch transition 54 and upper shell 34 sidebars 19a and 19b, elastic bending occurs when bolts 18 are tightened. Also, elastic behavior of top shell 34 occurs at a distance from the body to branch transition 54, providing gasket compression at main seal bead 22. This elastic bending is utilized to energize specially configured gasket main seal 22, which provides for gasket sealing on an increased range of fluid carrying pipe diameters for a given sleeve size. Thus, gasket seal 22 is thicker where shell 34 will flex to allow that flexure and the resulting conformance of sleeve 15 to the diameter of pipe 16. Gasket seal 22 is thinner where shell 34 is more rigid and flexure is less likely to occur. The additional outlet seal bead thickness (stand off height) is also divided between the tapping sleeve shell side and the fluid carrying pipe side of the main matte sheet of the upper gasket to eliminate the potential for gasket rollover.

Figure 18:
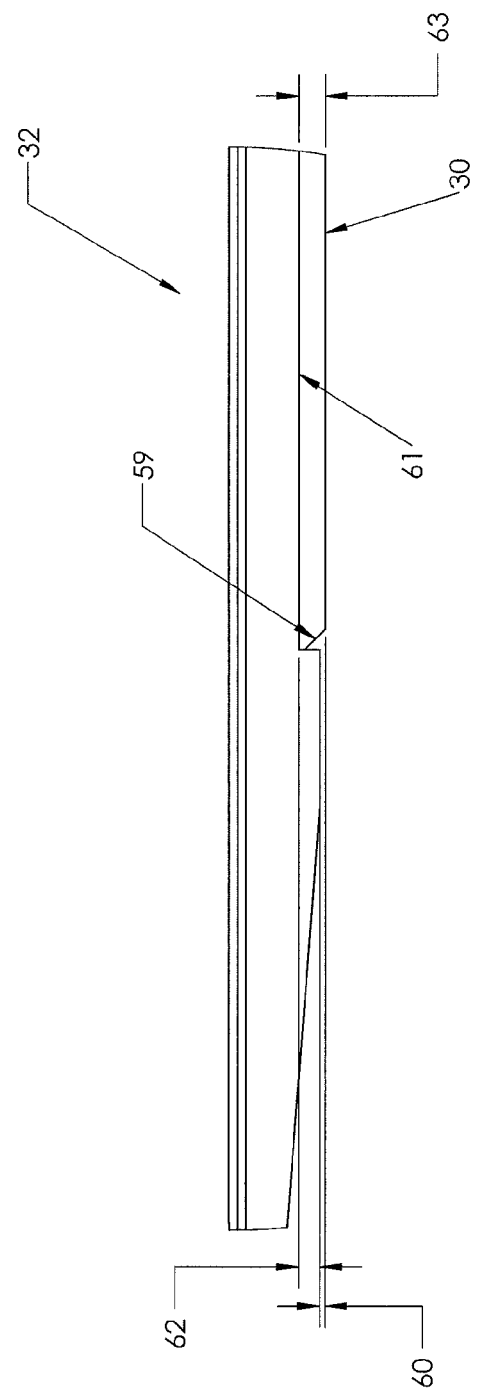
FIG. 18 is an enlarged detailed view of the upper gasket and spanner shown in FIG. 17, taken within the indicated circle R of FIG. 17.

As shown in FIGS. 1 and 2, spanners 30 and 31 are metallic strips that span the arc shaped gap between the longitudinally extending edges 73 and 74 of top half-shell 34 and lower half-shell 40 using the compression force exerted by the top and lower half-shell edges as sleeve 14 is tightened to fluid carrying pipe 16 to compress matte gaskets 32 and 42 to fluid carrying pipe 16. Current tapping sleeve gasket designs employ spanner strips that are embedded into the matte gasket, lie flush with the surface of the tapping sleeve side of the matte gasket, and do not project above the "outer" surface of the main gasket sheet. In this embodiment, as shown in FIGS. 3 and 18, spanners 30 and 31 are of an increased thickness, and project beyond recess 61 in upper main gasket sheet 32 a distance 60. The longitudinally extending edges of spanners 30 and 31 are chamfered and/or planished 59 to allow for the outer shell to climb up (slide under) the spanner shell band during sleeve installation and tightening without interference or snagging. By using thicker spanner material, and allowing it to project above the tapping sleeve side of gasket 32 surface, gasket extrusion is minimized while allowing for maximum gasket thickness between the spanner inner surface and the fluid carrying pipe outer surface. This reduces the overall matte gasket thickness required thereby reducing manufacturing costs.

The present invention contemplates that many changes and modifications may be made. Therefore, while the presently-preferred form of the improved tapping sleeve assembly has been shown and described, and a number of alternatives discussed, persons skilled in this art will readily appreciate that various additional changes and modifications may be made without departing from the spirit of the invention, as defined and differentiated by the following claims.

What is claimed is:

1. A tapping sleeve assembly comprising:
a sleeve configured to clamp a main fluid conduit oriented about a longitudinal axis;
said sleeve having a first member, a second member separate from said first member, and a connecting assembly between said first member and said second member;
said first member having a branch aperture configured to communicate with a branch fluid conduit;
said connecting assembly configured and arranged to tighten said first and said second members to said main fluid conduit;
a gasket configured to be disposed between said first member and said main fluid conduit;
said gasket having a protruding aperture seal configured to extend around said branch aperture between said sleeve and said main fluid conduit and to be offset a non-uniform distance from said branch aperture;
said protruding aperture seal having a first inwardly protruding portion extending substantially parallel to said longitudinal axis and having a radial profile thickness relative to said longitudinal axis;
at least one inwardly protruding circumferential seal bead extending from said first inwardly protruding portion of said protruding aperture seal away from said branch aperture in a direction substantially transverse to said longitudinal axis;
wherein said first inwardly protruding portion of said protruding aperture seal is closer to said branch aperture than said circumferential seal bead;
said circumferential seal bead having a main length portion having a radial profile thickness relative to said longitudinal axis less than said radial profile thickness of said first inwardly protruding portion of said protruding aperture seal;
said circumferential seal bead having a junction end portion between said main length portion and said first inwardly protruding portion of said protruding aperture seal;
said junction end portion of said circumferential seal bead having along its length a non-uniform radial profile thickness relative to said longitudinal axis; and
said protruding aperture seal having along its length a non-uniform radial profile thickness relative to said longitudinal axis.

2. The tapping sleeve set forth in claim 1, wherein said protruding aperture seal comprises a first outwardly extending longitudinally running portion having a radial profile thickness relative to said longitudinal axis and a first outwardly extending transversely running portion having a radial profile thickness relative to said longitudinal axis, and wherein said radial profile thickness relative to said longitudinal axis of said first outwardly extending transversely running portion is reduced from said radial profile thickness relative to said longitudinal axis of said first outwardly extending longitudinally running portion.

3. The tapping sleeve set forth in claim 2, wherein said radial profile thickness relative to said longitudinal axis of said first outwardly extending transversely running portion changes in proportion to its transverse distance from said longitudinal axis.

4. The tapping sleeve set forth in claim 3, wherein said radial profile thickness relative to said longitudinal axis of said first outwardly extending transversely running portion changes non-linearly in proportion to its transverse distance from said longitudinal axis.

5. The tapping sleeve set forth in claim 1, wherein said connecting assembly comprises:
a first side bar element connected to a longitudinally extending edge of said first member and a second side bar element connected to a longitudinally extending edge of said second member;
said first side bar comprising a first mounting plate configured to be oriented in a plane substantially tangential to an outer surface of said main fluid conduit;
said second side bar comprising a second mounting plate configured to be oriented in a plane substantially tangential to an outer surface of said main fluid conduit;
multiple bolt receiving lugs extending from said first mounting plate and multiple bolt receiving lugs extending from said second mounting plate at corresponding positions along said longitudinal axis; and
a bolt extending between each of said respective lugs on said first mounting plate and said second mounting plate at each of said longitudinal positions.

6. A tapping sleeve assembly comprising:
a sleeve configured to clamp on to a main fluid conduit oriented about a longitudinal axis;
said sleeve having a first member, a second member separate from said first member, and a connecting assembly between said first member and said second member;
a branch aperture in said first member configured to communicate with a branch fluid conduit;
said connecting assembly configured and arranged to tighten said first and said second members to said main fluid conduit from a non-actuated position to a tightened position;
a gasket configured to be disposed between said first member and said main fluid conduit;
said gasket comprising a flexible sheet having an inwardly facing surface and an outwardly facing surface and a thickened protruding aperture seal configured to extend around said branch aperture between said sleeve and said main fluid conduit;
said protruding aperture seal having along its length around said branch aperture a non-uniform radial profile thickness relative to said longitudinal axis when said connecting assembly is in said non-actuated position;
said protruding aperture seal having a first protruding portion orientated substantially parallel to said longitudinal axis, said first protruding portion having a first radial profile thickness relative to said longitudinal axis;
said protruding aperture seal having a second protruding portion orientated substantially transverse to said longitudinal axis, said second protruding portion having a second radial profile thickness relative to said longitudinal axis; and
said first radial profile thickness relative to said longitudinal axis of said first protruding portion being greater than said second radial profile thickness relative to said longitudinal axis of said second protruding portion.

7. The tapping sleeve set forth in claim 6, wherein said first protruding portion of said protruding aperture seal comprises a first outwardly extending longitudinally running portion having a radial profile thickness relative to said longitudinal axis and said second protruding portion of said protruding aperture seal comprises a first outwardly extending transversely running portion having a radial profile thickness relative to said longitudinal axis, and wherein said radial profile thickness relative to said longitudinal axis of said first outwardly extending transversely running portion is reduced from said radial profile thickness relative to said longitudinal axis of said first outwardly extending longitudinally running portion.

8. The tapping sleeve set forth in claim 7, wherein said radial profile thickness relative to said longitudinal axis of said first outwardly extending transversely running portion changes in proportion to its transverse distance from said longitudinal axis.

9. The tapping sleeve set forth in claim 8, wherein said radial profile thickness relative to said longitudinal axis of said first outwardly extending transversely running portion changes non-linearly in proportion to its transverse distance from said longitudinal axis.

10. The tapping sleeve set forth in claim 7, wherein said protruding aperture seal comprises a second outwardly extending longitudinally running portion having a radial profile thickness relative to said longitudinal axis and a second outwardly extending transversely running portion having a radial profile thickness relative to said longitudinal axis and said radial profile thickness relative to said longitudinal axis of said second outwardly extending transversely running portion is reduced from said radial profile thickness relative to said longitudinal axis of said second outwardly extending longitudinally running portion.

11. The tapping sleeve set forth in claim 6, wherein said protruding aperture seal comprises a portion having a radial profile thickness relative to said longitudinal axis that changes substantially in proportion to its transverse distance from said longitudinal axis.

12. The tapping sleeve set forth in claim 6, wherein said first protruding portion of said protruding aperture seal is configured to be compressed between said first member and said main fluid conduit before said second protruding portion of said protruding aperture seal is compressed between said first member and said main fluid conduit when said connecting assembly is tightened from said non-actuated position to said tightened position.

13. The tapping sleeve assembly set forth in claim 6, wherein said protruding aperture seal is offset a non-uniform distance from said branch aperture.

14. The tapping sleeve assembly set forth in claim 6, wherein said protruding aperture seal is molded separately from said flexible sheet.

15. The tapping sleeve set forth in claim 6, wherein said connecting assembly comprises:
- a first side bar element connected to a longitudinally extending edge of said first member and a second side bar element connected to a longitudinally extending edge of said second member;
- said first side bar comprising a first mounting plate configured to be oriented in a plane substantially tangential to an outer surface of said main fluid conduit;
- said second side bar comprising a second mounting plate configured to be oriented in a plane substantially tangential to an outer surface of said main fluid conduit;
- multiple bolt receiving lugs extending from said first mounting plate and multiple bolt receiving lugs extending from said second mounting plate at corresponding positions along said longitudinal axis; and
- a bolt extending between each of said respective lugs on said first mounting plate and said second mounting plate at each of said longitudinal positions;
- whereby said first side bar and said second side bar may be drawn towards each other with a nut on each of said respective bolts.

16. The tapping sleeve set forth in claim 15, wherein said first and said second side bars are L-shaped members.

17. A tapping sleeve assembly comprising:
- a sleeve configured to clamp on to a main fluid conduit oriented about a longitudinal axis;
- said sleeve having a first member, a second member separate from said first member, and a connecting assembly between said first member and said second member;
- said first member having a branch aperture configured to communicate with a branch fluid conduit;
- said connecting assembly configured and arranged to tighten said first and said second members to said main fluid conduit;
- a gasket configured to be disposed between said first member and said main fluid conduit;
- said gasket comprising a flexible sheet and a thickened aperture seal configured to extend around said branch aperture between said sleeve and said main fluid conduit;
- said thickened aperture seal having a first inwardly extending portion extending substantially parallel to said longitudinal axis;
- said first inwardly extending portion of said thickened aperture seal having a radial profile thickness relative to said longitudinal axis;
- said gasket having at least one inwardly extending circumferential seal bead extending from said first inwardly extending portion of said thickened aperture seal away from said branch aperture in a direction substantially transverse to said longitudinal axis;
- wherein said first inwardly extending portion of said thickened aperture seal is closer to said branch aperture than said circumferential seal bead;
- said circumferential seal bead having a main length portion having a radial profile thickness relative to said longitudinal axis less than said radial profile thickness of said first inwardly extending portion of said thickened aperture seal; and
- said circumferential seal bead having a junction end portion between said main length portion and said first inwardly extending portion of said thickened aperture seal; and
- said junction end portion of said circumferential seal bead having a radial profile thickness relative to said longitudinal axis greater than said radial profile thickness relative to said longitudinal axis of said main length portion.

18. The tapping sleeve assembly set forth in claim 17, wherein said junction end portion is tapered from substantially said thickness of said main length portion to substantially said thickness of said first inwardly extending portion of said thickened aperture seal.

19. The tapping sleeve assembly set forth in claim 17, wherein said circumferential seal bead has a dual lip profile configuration.

20. A tapping sleeve assembly comprising:
- a sleeve configured to clamp a main fluid conduit oriented about a longitudinal axis;
- said sleeve having a first member, a second member separate from said first member, and a connecting assembly between said first member and said second member;
- said first member having a branch aperture configured to communicate with a branch fluid conduit;
- said connecting assembly configured and arranged to tighten said first and said second members to said main fluid conduit;
- a gasket configured to be disposed between said first member and said main fluid conduit;
- said gasket having a protruding aperture seal configured to extend around said branch aperture between said sleeve and said main fluid conduit and to be offset a non-uniform distance from said branch aperture;

said protruding aperture seal having a first inwardly protruding portion extending substantially parallel to said longitudinal axis and having along its length a radial profile thickness relative to said longitudinal axis;

at least one inwardly protruding circumferential seal bead extending from said first inwardly protruding portion of said protruding aperture seal away from said branch aperture in a direction substantially transverse to said longitudinal axis;

wherein said first inwardly protruding portion of said protruding aperture seal is closer to said branch aperture than said circumferential seal bead;

said circumferential seal bead having a main length portion having a radial profile thickness relative to said longitudinal axis less than said radial profile thickness of said first inwardly protruding portion of said protruding aperture seal;

said circumferential seal bead having a junction end portion between said main length portion and said first inwardly protruding portion of said protruding aperture seal;

said junction end portion of said circumferential seal bead having along its length a non-uniform radial profile thickness relative to said longitudinal axis;

said protruding aperture seal having along its length a non-uniform radial profile thickness relative to said longitudinal axis.

21. The tapping sleeve assembly set forth in claim 20, wherein said aperture seal comprises:

a first protruding portion having an offset distance from said branch junction and orientated substantially parallel to said longitudinal axis;

a second protruding portion having an offset distance from said branch junction and orientated substantially transverse to said longitudinal axis;

wherein said offset distance of said first protruding portion is different than said offset distance of said second protruding portion.

22. The tapping sleeve assembly set forth in claim 21, wherein said offset distance of said first protruding portion is less than said offset distance of said second protruding portion.

23. The tapping sleeve assembly set forth in claim 20, wherein said aperture seal comprises:

an arcuate protruding portion offset outwardly from said branch junction and having an inner radius of curvature relative to said branch longitudinal axis; and wherein said branch fluid conduit has a branch diameter and said inner radius of curvature of said arcuate protruding portion is less than about twenty-five percent of said branch diameter.

24. The tapping sleeve assembly set forth in claim 20, wherein attachment of said branch fluid conduit to said first portion at said branch junction substantially stiffens said first portion in a region proximate to said branch junction and wherein said offset distance is outward of said substantially stiffened region.

* * * * *